(12) United States Patent
Bunte et al.

(10) Patent No.: US 10,116,465 B2
(45) Date of Patent: Oct. 30, 2018

(54) METHOD FOR OPERATING A NETWORK

(71) Applicant: Beckhoff Automation GmbH, Verl (DE)

(72) Inventors: Thorsten Bunte, Guetersloh (DE); Holger Buettner, Berlin (DE); Erik Vonnahme, Salzkotten (DE); Dirk Janssen, Verl (DE); Thomas Rettig, Rheda-Wiedenbrueck (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 231 days.

(21) Appl. No.: 14/739,416

(22) Filed: Jun. 15, 2015

(65) Prior Publication Data

US 2015/0365296 A1 Dec. 17, 2015

(30) Foreign Application Priority Data

Jun. 16, 2014 (DE) .................. 10 2014 108 455

(51) Int. Cl.
*G06F 15/16* (2006.01)
*H04L 12/46* (2006.01)
*H04L 12/40* (2006.01)

(52) U.S. Cl.
CPC .......... *H04L 12/4625* (2013.01); *H04L 12/40* (2013.01); *H04L 2012/4026* (2013.01)

(58) Field of Classification Search
CPC ..... H04L 29/06; H04L 12/4625; G06F 13/40; G06F 13/36
See application file for complete search history.

(56) References Cited

U.S. PATENT DOCUMENTS

| 5,544,332 A | * | 8/1996 | Chen | ..................... G06F 13/362 700/14 |
| 6,026,455 A | * | 2/2000 | Shah | ................... G06F 13/4031 710/100 |
| 6,654,355 B1 | * | 11/2003 | Marbach | ............. H04L 12/4135 370/285 |

(Continued)

FOREIGN PATENT DOCUMENTS

| DE | 60026734 T2 | 9/2006 |
| DE | 102009045055 A1 | 3/2011 |
| WO | 2014071970 A1 | 5/2014 |

OTHER PUBLICATIONS

Beckhoff Hardware Data Sheet Section I, New Automation Technology, dated Mar. 1, 2013, Version 2.1 (57 pages).

(Continued)

*Primary Examiner* — Tauqir Hussain
*Assistant Examiner* — Kamran Mohammadi
(74) *Attorney, Agent, or Firm* — Dorsey & Whitney LLP (57) ABSTRACT

A method for operating a network that has a network subscriber that is connected to a superordinate bus and to a subordinate bus comprises steps for the reception of a first superordinate data message by the network subscriber via the superordinate bus, the extraction of first data from the first superordinate data message by the network subscriber and for the transmission of a first subordinate data message by the network subscriber via the subordinate bus. In one case, the first subordinate data message comprises the first data.

16 Claims, 7 Drawing Sheets

(56) References Cited

U.S. PATENT DOCUMENTS

| | | | | |
|---|---|---|---|---|
| 8,060,677 B2* | 11/2011 | Rostan | ................. | H04L 12/403 710/105 |
| 2006/0101184 A1* | 5/2006 | Hegarty | .............. | G06F 11/2007 710/307 |
| 2007/0121670 A1* | 5/2007 | Chen | ....................... | H04L 69/08 370/466 |
| 2009/0119437 A1* | 5/2009 | Hilscher | ............... | H04L 12/407 710/305 |
| 2011/0029690 A1* | 2/2011 | Rachet | ................... | G06F 9/541 709/238 |
| 2013/0173868 A1* | 7/2013 | Leyrer | ................ | G06F 12/1483 711/152 |
| 2013/0208724 A1* | 8/2013 | Colucci | ............ | H04L 12/40169 370/392 |
| 2014/0325102 A1* | 10/2014 | Opitz | ................. | G06F 13/4256 710/110 |

OTHER PUBLICATIONS

Beckhoff, Hardware Data Sheet, New Automation Technology, dated May 3, 2010, Version 1.8 (159 pages).

\* cited by examiner

METHOD FOR OPERATING A NETWORK

CROSS-REFERENCE TO RELATED APPLICATIONS

This application claims priority to German Patent Application, DE 10 2014 108 455.1, "Verfahren zum Betreiben eines Netzwerks," filed 16 Jun. 2014, which is incorporated by reference herein, in the entirety and for all purposes.

FIELD

The present invention relates to a method for operating a network.

BACKGROUND

Data networks are known from the prior art. Wired data networks according to the prior art are frequently based on the Ethernet standard. The umbrella term "Industrial Ethernet" is used in the prior art for the known practice of using Ethernet data networks in order to network devices in industrial manufacture and automation engineering. Such data networks can be based on the EtherCAT standard according to IEC standard "IEC 61158", for example.

Data networks consist of a plurality of networked network subscribers. In simple data networks, data messages can be routed through all network subscribers in the data network. However, if portions of a data network are intended to be operated using different operating parameters than other portions of the network, for example at different transmission rates, complex network planning is necessary in order to stipulate which data messages can be transmitted to which portions of the data network at which times.

SUMMARY

An object of the present invention is to specify an improved method for operating a network.

In an embodiment, a method for operating a network that has a network subscriber that is connected to a superordinate bus and to a subordinate bus comprises steps for the reception of a first superordinate data message by the network subscriber via the superordinate bus, for the extraction of first data from the first superordinate data message by the network subscriber and for the transmission of a first subordinate data message by the network subscriber via the subordinate bus. The first subordinate data message comprises the first data.

In an embodiment, a method for operating a network that has a network subscriber that is connected to a superordinate bus and to a subordinate bus comprises steps for the reception of a first superordinate data message by the network subscriber via the superordinate bus, for the extraction of first data from the first superordinate data message by the network subscriber and for the transmission of a first subordinate data message by the network subscriber via the subordinate bus. The first subordinate data message comprises the first data. In this embodiment, the method comprises further steps for the reception of a second subordinate data message by the network subscriber via the subordinate bus, for the extraction of second data from the second subordinate data message by the network subscriber and for the transmission of a second superordinate data message by the network subscriber via the superordinate bus. The second superordinate data message comprises the second data.

The second superordinate data message is formed from the first superordinate data message by replacing the first data by the second data.

BRIEF DESCRIPTION OF THE DRAWINGS

The invention is explained in more detail below with reference to figures, in which.

DETAILED DESCRIPTION

Figure 1:
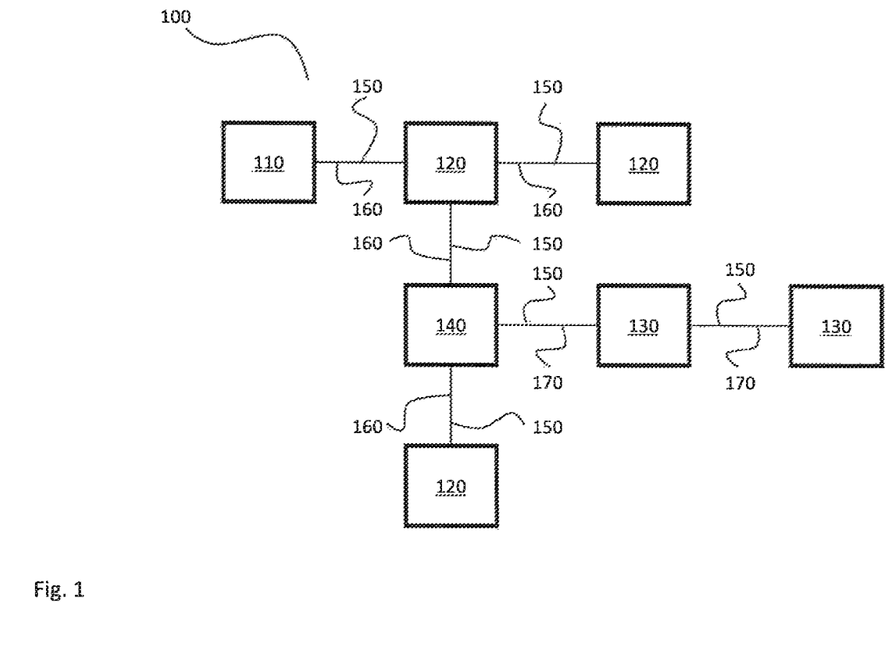
FIG. 1 shows a schematic illustration of a network.

FIG. 1 shows a schematic illustration of a network 100. The network 100 is a data network for the transmission of data between network subscribers in the network 100. The network 100 may be a wireless network or a wired network. By way of example, the network 100 may be a network based on the Ethernet standard. The network 100 can be used to network devices in industrial manufacture and/or for control or automation purposes. The network 100 may be a network based on the EtherCAT standard, for example.

The network 100 comprises a master network subscriber 110, a plurality of first ordinary network subscribers 120, a plurality of second ordinary network subscribers 130 and an interface network subscriber 140. The master network subscriber 110, the first ordinary network subscribers 120, the second ordinary network subscribers 130 and the interface network subscriber 140 are connected to one another via connections 150. In this case, the network subscribers 110, 120, 130, 140 in the network 100 are arranged in a mixed topology. The master network subscriber 110 is connected to one of the first ordinary network subscribers 120 via a connection 150. Said one of the first ordinary network subscribers is connected to a further first ordinary network subscriber 120 and to the interface network subscriber 140 via two further connections 150. The interface network subscriber 140 is connected to a further first ordinary network subscriber 120 and to one of the second ordinary network subscribers 130 via further connections 150. This second ordinary network subscriber 130 is connected to the further second ordinary network subscriber 130 via a further connection 150. This topology of the network 100 is chosen merely by way of example, however. The network 100 could also have a different topology.

If the network 100 is an EtherCAT network, the first ordinary network subscribers 120 and the second ordinary network subscribers 130 in the network 100 may be EtherCAT slave controllers. By way of example, the ordinary network subscribers 120, 130 can serve as interfaces to slave application devices. By way of example, the ordinary network subscribers 120, 130 may be designed to connect EtherCAT application controllers.

The master network subscriber 110 in the network 100 may be designed to undertake control and management tasks in the network 100. By way of example, the master network subscriber 110 may be designed to configure the ordinary network subscribers 120, 130 and the interface network subscriber 140 and to coordinate data communication within the network 100.

The connections 150 between the master network subscriber 110, the first ordinary network subscribers 120 and the interface network subscriber 140 form a superordinate bus 160 of the network 100. The connections 150 between the interface network subscriber 140 and the second ordinary network subscribers 130 form a subordinate bus 170 of the network 100. The interface network subscriber 140 therefore connects the superordinate bus 160 of the network 100 to the subordinate bus 170 of the network 100.

The superordinate bus 160 and the subordinate bus 170 of the network 100 may be configured differently. By way of example, the superordinate bus 160 can be operated at a different transmission rate than the subordinate bus 170. Thus, the superordinate bus 160 can be operated at a transmission rate of 1 Gbit/s, for example, while the subordinate bus 170 is operated at a transmission rate of 100 Mbit/s. In this case, the first ordinary network subscribers 120 are designed to be operated at a transmission rate of 1 Gbit/s, while the second ordinary network subscribers 130 are designed to be operated at a transmission rate of 100 Mbit/s. However, it is also possible for the superordinate bus 160 and/or the subordinate bus 170 of the network 100 to be operated at transmission rates other than those cited and/or for the superordinate bus 160 and the subordinate bus 170 to differ from one another in parameters other than the transmission rate.

For the purpose of data communication in the network 100, data messages circulate in the network 100 between the network subscribers 110, 120, 130, 140. In this case, data messages circulate on the superordinate bus 160 of the network 100 between the master network subscriber 110, the first ordinary network subscribers 120 and the interface network subscriber 140. Data messages circulating on the superordinate bus 160 are referred to as superordinate data messages in the remainder of the description.

By way of example, a superordinate data message can be routed from the master network subscriber 110 to the first ordinary network subscriber 120 connected to the master network subscriber 110 and from said first ordinary network subscriber to the directly connected further first ordinary network subscriber 120. The latter returns the superordinate data message to the first ordinary network subscriber 120 connected to the master network subscriber 110, from which first ordinary network subscriber it is conveyed to the interface network subscriber 140. The interface network subscriber 140 forwards the superordinate data message to the third of the first ordinary network subscribers 120, from where it is conveyed back to the master network subscriber 110 via the interface network subscriber 140 and the first ordinary network subscriber 120 connected to the master network subscriber 110. The interface network subscriber 140 therefore acts as a first ordinary network subscriber 120 for the other network subscribers 110, 120 arranged on the superordinate bus 160.

During the circulation of the superordinate data message, each of the first ordinary network subscribers 120 and the interface network subscriber 140 remove from the superordinate data message data addressed to the respective network subscriber 120, 140 and write data to be provided by the respective network subscriber 120, 140 to the superordinate data message. This can take place during the first pass of the superordinate data message to the respective network subscriber 120, 140, for example.

Owing to the different configurations of the superordinate bus 160 and the subordinate bus 170 of the network 100, the second ordinary network subscribers 130 arranged on the subordinate bus 170 are decoupled from the circulation of the superordinate data messages on the superordinate bus 160 of the network 100. Otherwise, congestion or other disturbances could arise at the interface between the superordinate bus 160 and the subordinate bus 170.

Instead, the second ordinary network subscribers 130 arranged on the subordinate bus 170 are addressed by the master network subscriber 110 via the interface network subscriber 140. The interface network subscriber 140 receives, via superordinate data messages circulating on the superordinate bus 160, data that are to be sent to the second ordinary network subscribers 130 arranged on the subordinate bus 170 and forwards said data to the second ordinary network subscribers 130 arranged on the subordinate bus 170. Furthermore, the interface network subscriber 140 returns data received from the second ordinary network subscribers 130 arranged on the subordinate bus 170 to the master network subscriber 110 via the superordinate data messages circulating on the superordinate bus 160. In the interface network subscriber 140, the data interchanged between the master network subscriber 110 and the second ordinary network subscribers 130 arranged on the subordinate bus 170 pass through queues (first in first out memories—subsequently referred to as FIFOs) in both communication directions.

Data that are to be sent to the second ordinary network subscribers 130 are transmitted by the interface network subscriber 140 as data messages via the subordinate bus 170. Data messages circulating on the subordinate bus 170 are referred to as subordinate data messages in the remainder of the description. The interface network subscriber 140 routes every such subordinate data message via the connection 150 to the second ordinary network subscriber 130 connected to the interface network subscriber 140. Said second ordinary network subscriber forwards said data message via the further connection 150 to the further second ordinary network subscriber 130, from where it is conveyed back to the interface network subscriber 140 via the second ordinary network subscribers 130 connected to the interface network subscriber 140. From the point of view of the second ordinary network subscribers 130 arranged on the subordinate bus 170, the interface network subscriber 140 therefore behaves in the manner of a master network subscriber. The master network subscriber 110 and the first ordinary network subscribers 120 on the superordinate bus 160 are not visible to the second ordinary network subscribers 130 on the subordinate bus 170.

Figure 2:
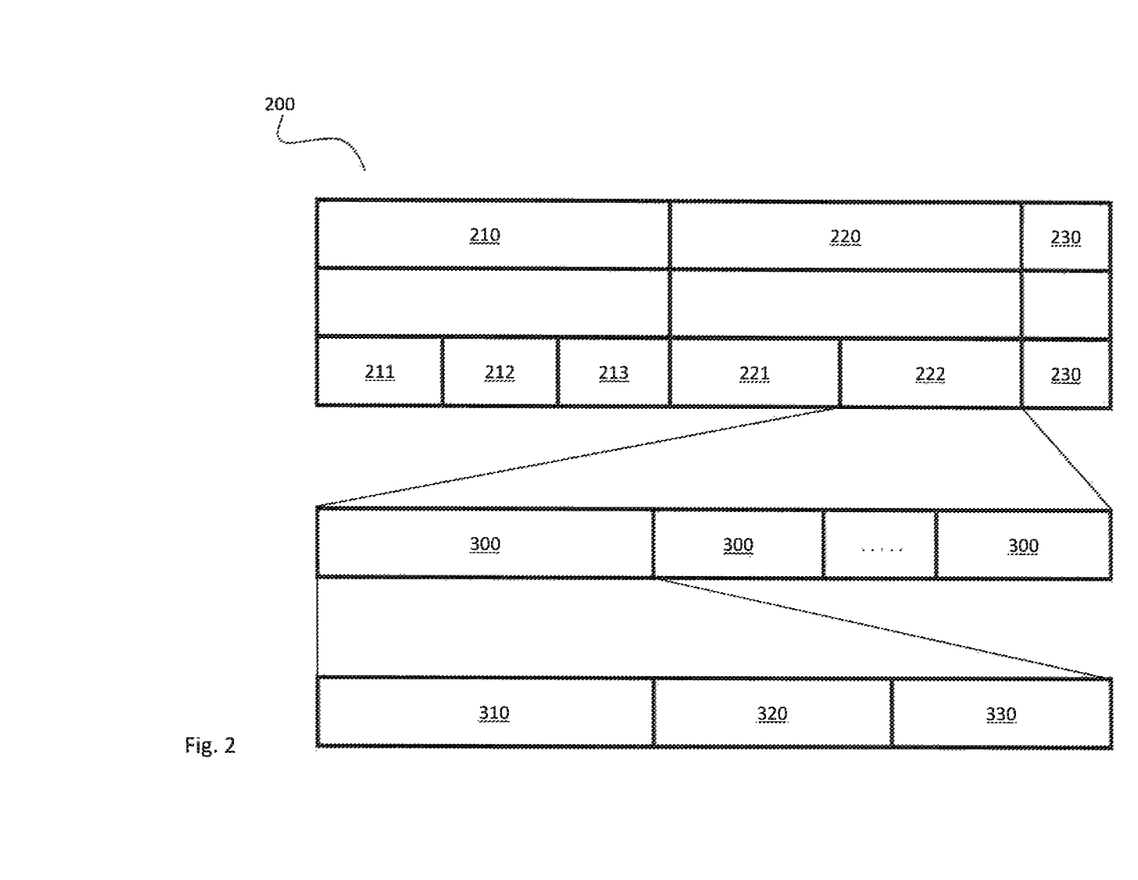
FIG. 2 shows a schematic illustration of a data message.

FIG. 2 shows an exemplary schematic illustration of a data message 200. By way of example, the data message 200 may be an Ethernet frame, particularly an EtherCAT frame. The data message 200 can have a total length of between 64 bytes and 1522 bytes. Alternatively, the data message 200 can also be an Ethernet jumbo frame having a greater length.

The data message 200 comprises a message header 210, a message data portion 220 that follows the message header 210 and a message checksum 230 that follows the message data portion 220. If the data message 200 is an Ethernet message, the message header 210 can have a length of 14 bytes, the message data portion 220 can have a length of between 46 bytes and 1500 bytes and the message checksum 230 can have a length of 4 bytes, for example.

If the data message 200 is an Ethernet message, the message header 210 can comprise a message addressee 211, a message sender 212 and a message type 213. By way of example, the message addressee 211 and the message sender 212 may be indicated in the form of MAC addresses. If the data message 200 is an EtherCAT message, the message type 213 can have the value 0x88A4.

If the data message 200 is an EtherCAT message, the message data portion 220 of the data message 200 may be divided into a data portion head 221 and a data portion body 222 that follows the data portion head 221. The data portion head 221 can have a length of 2 bytes, for example.

The data portion body 222 comprises one or more datagrams 300 arranged in succession. Each datagram 300 is in turn divided into a datagram header 310, a datagram data portion 320 and a datagram counter 330. The datagram header 310 can have a length of 10 bytes, for example, and contains header data, particularly an EtherCAT command and an address. The datagram data portion 320 can have a length of between 0 byte and 1486 bytes and contain useful data, for example. The datagram counter 330 can have a length of 2 bytes and be used for control purposes, for example. The datagram counter 330 can be referred to as a working counter.

Figure 3:
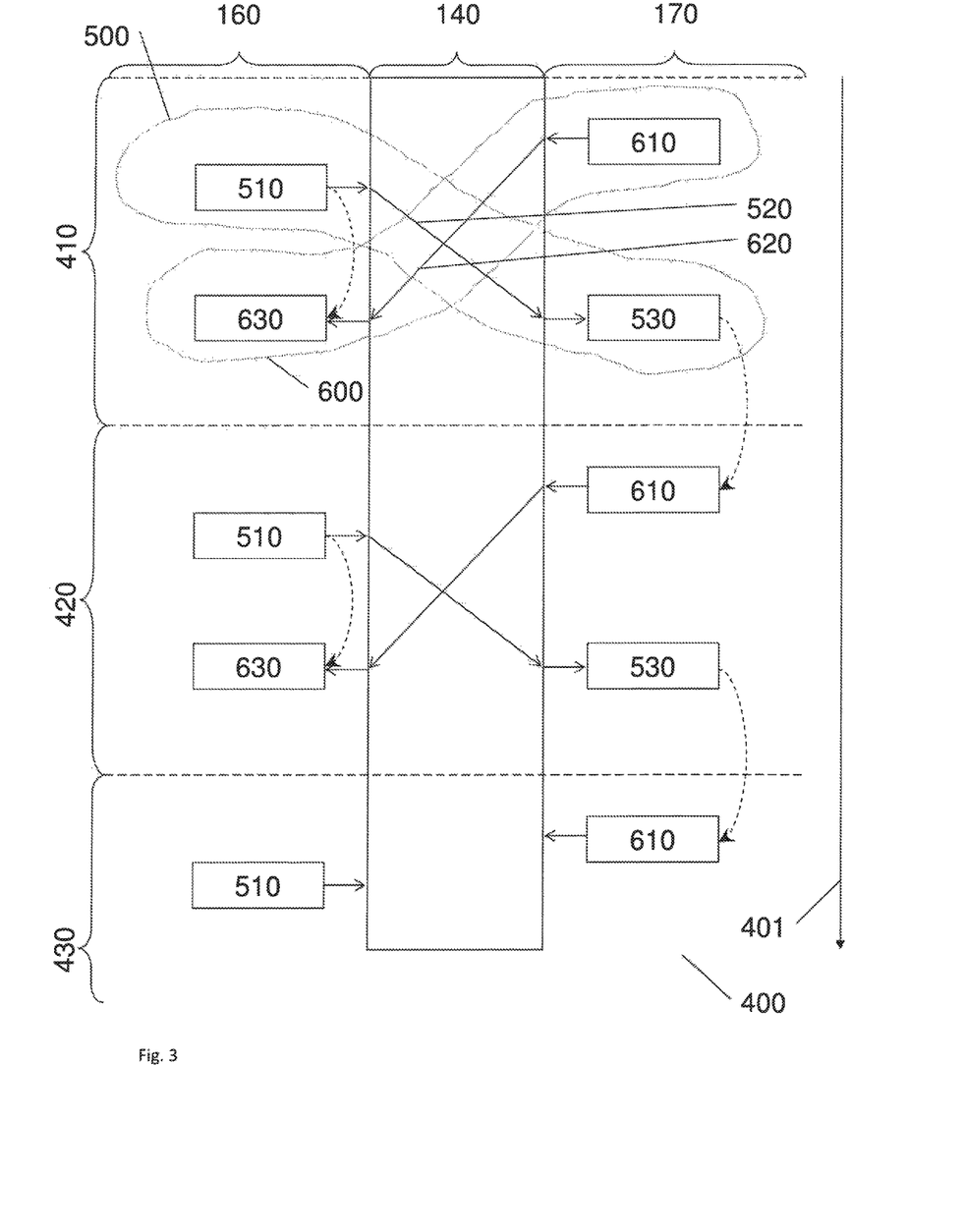
FIG. 3 shows a schematic flowchart for a first method for operating a network.

The interface network subscriber 140 of the network 100, which is shown in FIG. 1, is used in the network 100 as an interface between data communication on the superordinate bus 160 and data communication on the subordinate bus 170. FIG. 3 shows a schematic flowchart for a first method 400 for accomplishing the tasks performed by the interface network subscriber 140. A vertical axis of the chart plots a time 401 progressing from top to bottom. In the center, the interface network subscriber 140 is schematically shown. To the left of the interface network subscriber 140, data messages arriving with the interface network subscriber 140 and outgoing from the interface network subscriber 140 via the superordinate bus 160 are shown. To the right of the interface network subscriber 140, data messages outgoing from the interface network subscriber 140 and arriving at the interface network subscriber 140 via the subordinate bus 170 of the network 100 are shown.

The first method 400 is preferably performed repeatedly. FIG. 3 shows a first repetition 410, a second repetition 420 and portions of a third repetition 430 of the first method 400.

The first method 400 comprises a first method portion 500 and a second method portion 600. The first method portion 500 and the second method portion 600 each comprise a plurality of single method steps and are performed in parallel with one another at least in part.

In a first method step of the first method portion 500 of the first method 400, the interface network subscriber 140 receives a first superordinate data message 510 via the superordinate bus 160. The first superordinate data message 510 is designed in the manner of the data message 200 in FIG. 2, for example.

In a second method step of the first method portion 500 of the first method 400, the interface network subscriber 140 extracts first data 520 from the first superordinate data message 510. In this case, the first data 520 can be written to a send queue (send FIFO) of the interface network subscriber 140, for example.

In a third method step of the first method portion 500 of the first method 400, the interface network subscriber 140 transmits a first subordinate data message 530 via the subordinate bus 170 of the network 100. In this case, the first subordinate data message 530 is designed in the manner of the data message 200 in FIG. 2, for example. The first subordinate data message 530 comprises the first data 520 extracted from the first superordinate data message 510 in the preceding method step. For this purpose, the first data 520 can be removed from the send queue (send FIFO) of the interface network subscriber 140, for example.

In a first method step of the second method portion 600 of the first method 400, the interface network subscriber 140 receives a second subordinate data message 610 via the subordinate bus 170 of the network 100. The second subordinate data message 610 may be designed in the manner of the data message 200 in FIG. 2, for example.

The reception of the second subordinate data message 610 via the subordinate bus 170 normally takes place for every repetition 410, 420, 430 of the first method 400 before the reception of the first superordinate data message 510 via the superordinate bus 160. The first method step of the second method portion 600 of the first method 400 is therefore normally performed before the first method step of the first method portion 500 of the first method 400.

In a second method step of the second method portion 600 of the first method 400, the interface network subscriber 140 extracts second data 620 from the second subordinate data message 610 received in the previous method step of the second method portion 600. In this case, the second data 620 can be written to a receive queue (receive FIFO) of the interface network subscriber 140, for example.

In a third method step of the second method portion 600 of the first method 400, the interface network subscriber 140 transmits a second superordinate data message 630 via the superordinate bus 160 of the network 100. The second superordinate data message 630 may be designed in the manner of the data message 200 in FIG. 2, for example. The second superordinate data message 630 comprises the second data 620 extracted from the second subordinate data message 610 in the preceding second method step of the second method portion 600 of the first method 400. For this purpose, the second data 620 can be removed from the receive queue (receive FIFO) of the interface network subscriber 140, for example.

The second superordinate data message 630 transmitted in the third method step of the second method portion 600 of the first method 400 can be formed by the interface network subscriber 140 from the first superordinate data message 510 received in the first method step of the first method portion 500 of the first method 400. In this case, the interface network subscriber 140 replaces the first data 520 with the second data 620. Hence, the interface network subscriber 140 receives the first superordinate data message 510 via the superordinate bus 160, removes the first data 520 and replaces the latter with the second data 620 and forwards the second superordinate data message 630 formed thereby via the superordinate bus 160. Hence, from the point of view of the network subscribers 110, 120 arranged on the superordinate bus 160 of the network 100, the interface network subscriber 140 behaves in the manner of the ordinary network subscribers 120.

The transmission of the second superordinate data message 630 via the superordinate bus 160 in the third method step of the second method portion 600 of the first method 400 can take place before, after or at the same time as the transmission of the first subordinate data message 530 via the subordinate bus 170 in the third method step of the first method portion 500 of the first method 400.

The first subordinate data message 530 transmitted by the interface network subscriber 140 via the subordinate bus 170 during the first repetition 410 of the first method 400 in the third method step of the first method portion 500 prompts the transmission of the second subordinate data message 610 received by the interface network subscriber 140 via the subordinate bus 170 during the second repetition 420 of the first method 400 in the first method step of the second method portion 600. This applies accordingly for every further repetition 410, 420, 430 of the first method 400 too.

In particular, the second subordinate data message 610 of every repetition 420, 430 of the first method 400 can be formed from the first subordinate data message 530 of the respectively preceding repetition 410, 420 of the first method 400. The interface network subscriber 140 transmits the first subordinate data message 530 via the subordinate bus 170 in the third method step of the first method portion 500. The first subordinate data message 530 passes through the second ordinary network subscribers 130 arranged on the subordinate bus 170 of the network 100 and is returned by these second ordinary network subscribers, with a possibly altered content, as a second subordinate data message 610 to the interface network subscriber 140. From the point of view of the second ordinary network subscribers 130 arranged on the subordinate bus 170 of the network 100, the interface network subscriber 140 therefore behaves in the manner of a master network subscriber.

Figure 4:
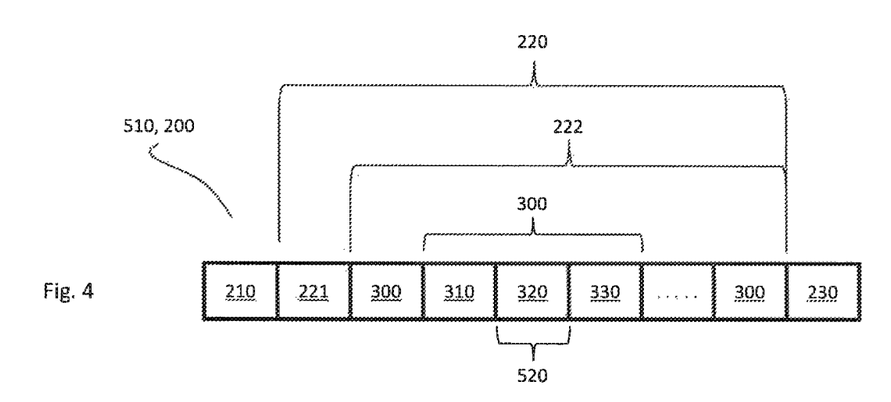
FIG. 4 shows a schematic illustration of a first superordinate data message.

FIG. 4 shows an exemplary schematic illustration of the first superordinate data message 510. In this example, the first superordinate data message 510 is designed in the manner of the data message 200 in FIG. 2. In this example, the first superordinate data message 510 comprises a plurality of datagrams 300. However, it would also be possible for a first superordinate data message 510 to be designed to have just one datagram 300.

The datagram data portion 320 of a datagram 300 of the first superordinate data message 510 contains the first data 520 that are extracted from the first superordinate data message 510 by the interface network subscriber 140. By way of example, the datagram header 310 of this datagram 300 of the first superordinate data message 510 can have an LRW command (logical memory read write) and address a send queue (send FIFO) of the interface network subscriber 140 in order to prompt the interface network subscriber 140 to extract the first data 520 from the datagram data portion 320 of the datagram 300 and to transmit it with the first subordinate data message 530 via the subordinate bus 170 of the network 100 in the subsequent method step of the first method portion 500 of the first method 400.

Figure 5:
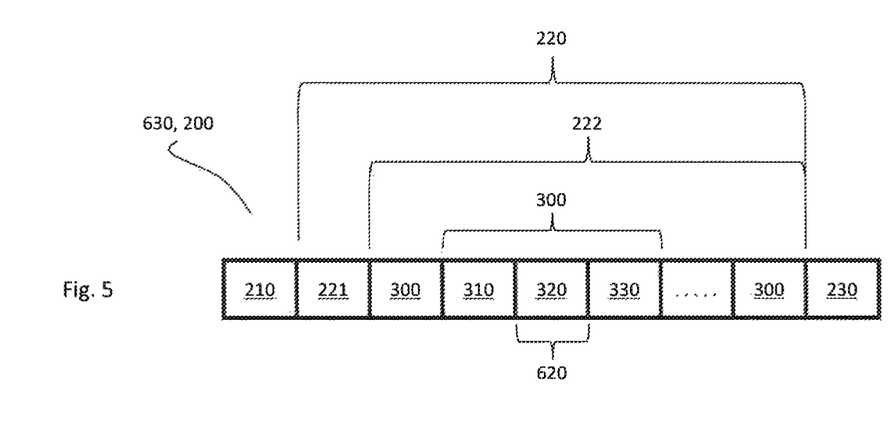
FIG. 5 shows a schematic illustration of a second superordinate data message.

FIG. 5 shows an exemplary schematic illustration of the second superordinate data message 630, which in this example is designed in the manner of the data message 200 in FIG. 2. In this example, the second superordinate data message 630 likewise has a plurality of datagrams 300. The datagram data portion 320 of a datagram 300 of the second superordinate data message 630 contains the second data 620. The second superordinate data message 630 can be formed by the interface network subscriber 140 by replacing the first data 520 with the second data 620 from the first superordinate data message 510.

Figure 6:
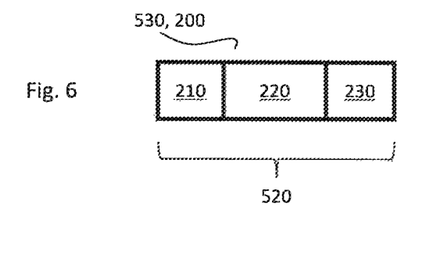
FIG. 6 shows a schematic illustration of a first subordinate data message in a first embodiment.

FIG. 6 shows a schematic illustration of a first possible embodiment of the first subordinate data message 530. In this case, the first subordinate data message 530 is designed in the manner of the data message 200 in FIG. 2. The first subordinate data message 530 is formed completely by the first data 520 extracted from the first superordinate data message 510. The first data 520 therefore comprise the complete first subordinate data message 530 with the message header 210 thereof, the message data portion 220 thereof and the message checksum 230 thereof.

Figure 7:
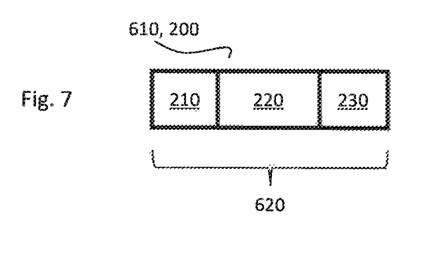
FIG. 7 shows a schematic illustration of a second subordinate data message in a first embodiment.

FIG. 7 shows a schematic illustration of a possible embodiment of the second subordinate data message 610. In this case, the second subordinate data message 610 is designed in the manner of the data message 200 in FIG. 2. The complete second subordinate data message 610 with its message header 210, its message data portion 220 and its message checksum 230 forms the second data 620 that are forwarded with the second superordinate data message 630 via the superordinate bus 160 of the network 100 by the interface network subscriber 140.

If the first data 520 comprise the first subordinate data message 530, as shown in FIG. 6, completely, then the complete second subordinate data message 610, as shown in FIG. 7, preferably forms the second data 620.

Figure 8:
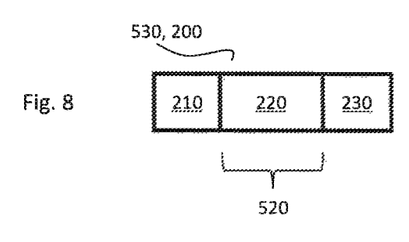
FIG. 8 shows a schematic illustration of a first subordinate data message in a second embodiment.

FIG. 8 shows a schematic illustration of a second possible embodiment of the first subordinate data message 530. The first subordinate data message 530 is designed in the manner of the data message 200 in FIG. 2 and comprises a message header 210, a message data portion 220 and a message checksum 230. The message data portion 220 of the first subordinate data message 530 is formed by the first data 520 extracted from the first superordinate data message 510 by the interface network subscriber 140. The first data 520 transmitted to the interface network subscriber 140 with the first superordinate data message 510 thus comprise the complete message data portion 220 of the first subordinate data message 530, but not the message header 210 and the message checksum 230.

The message header 210 of the first subordinate data message 530 is prefixed to the message data portion 220, formed by the first data 520, of the first subordinate data message 530 by the interface network subscriber 140. The message header 210 of the first subordinate data message 530 may be a preconfigured message header 210, for example.

The message checksum 230 of the first subordinate data message 530 is suffixed to the message data portion 220, formed by the first data 520, of the first subordinate data message 530 by the interface network subscriber 140. The message checksum 230 of the first subordinate data message 530 can be computed by the interface network subscriber 140, for example.

Figure 9:
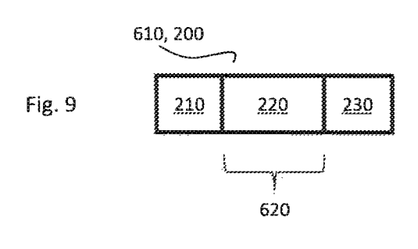
FIG. 9 shows a schematic illustration of a second subordinate data message in a second embodiment.

FIG. 9 shows a schematic illustration of a second possible embodiment of the second subordinate data message 610. In this case, the second subordinate data message 610 is designed in the manner of the data message 200 in FIG. 2. The second subordinate data message 610 has a message header 210, a message data portion 220 and a message checksum 230. The message data portion 220 of the second subordinate data message 610 forms the second data 620 that are extracted from the second subordinate data message 610 by the interface network subscriber 140.

If the first subordinate data message 530 is designed as in the illustration in FIG. 8, the second subordinate data message 610 is preferably designed as in the illustration in FIG. 9. The embodiments of the first subordinate data message 530 and the second subordinate data message 610 that are shown in FIGS. 8 and 9 afford the advantage over the embodiments of the first subordinate data message 530 and the second subordinate data message 610 that are shown in FIGS. 6 and 7 that the message headers 210 of the subordinate data messages 530, 610 are not included by the first data 520 and the second data 620. Therefore, the first data 520 and the second data 620 have a higher useful data proportion in the embodiment of FIGS. 8 and 9 than in the embodiment of FIGS. 6 and 7.

In a further possible embodiment of the first subordinate data message 530, the first data 520 comprise just the data portion body 222 of the message data portion 220 of the first subordinate data message 530, that is to say just one or more datagrams 300 of the first subordinate data message 530. In this case, the data portion head 221 of the message data portion 220 of the first subordinate data message 530 is also produced by the interface network subscriber 140, for example as a preconfigured data portion head 221.

In a corresponding further possible embodiment of the second subordinate data message 610, only the data portion body 222 of the message data portion 220 of the second subordinate data message 610 is extracted as second data 620. In this case, the second data 620 are thus formed just by one or more datagrams 300 of the second subordinate data message 610.

Advantageously, the first data 520 and the second data 620 have an even higher proportion of useful data in this embodiment of the first subordinate data message 530 and the second subordinate data message 630 than in the embodiments of FIGS. 8 and 9.

Figure 10:
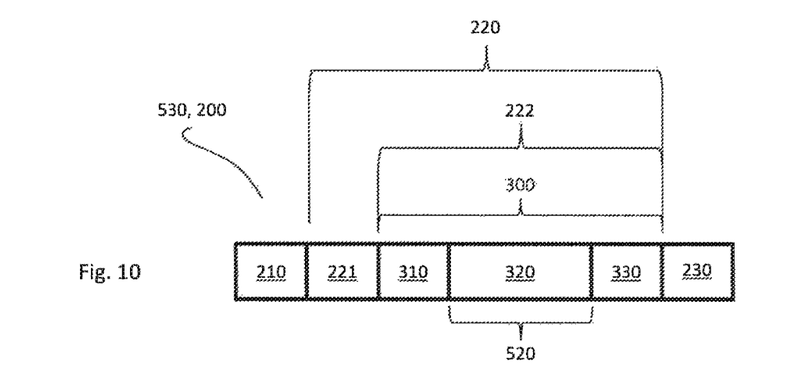
FIG. 10 shows a schematic illustration of a first subordinate data message in a third embodiment.

FIG. 10 shows a schematic illustration of a further possible embodiment of the first subordinate data message 530. In this embodiment too, the first subordinate data message 530 is constructed in the manner of the data message 200 in FIG. 2 and comprises a message header 210, a message data portion 220 and a message checksum 230. The message data portion 220 comprises a data portion head 221 and a data portion body 222, which comprises just a datagram 300. The datagram 300 has a datagram header 310, a datagram data portion 320 and a datagram counter 330. The datagram data portion 320 of the datagram 300 of the first subordinate data message 530 is formed by the first data 520. The remaining portions of the first subordinate data message 530 are added by the interface network subscriber 140. The message header 210, the data portion head 221 of the message data portion 220 and the datagram header 310 of the datagram 300 can be formed by preconfigured headers in this case.

Figure 11:
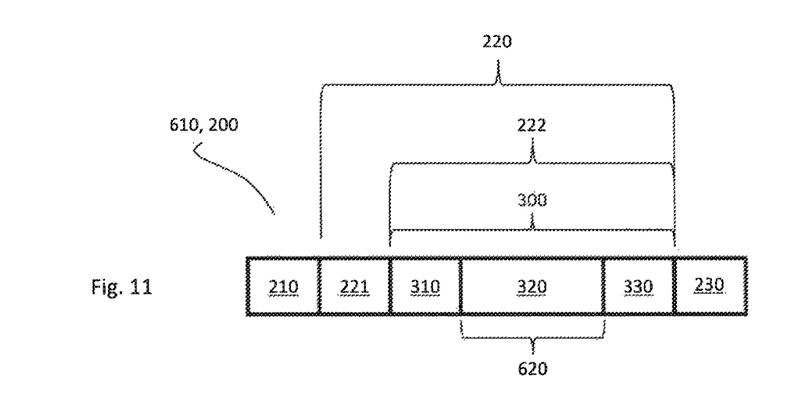
FIG. 11 shows a schematic illustration of a second subordinate data message in a third embodiment.

FIG. 11 shows a schematic illustration of a further possible embodiment of the second subordinate data message 610. In this embodiment too, the second subordinate data message 610 is constructed in the manner of the data message 200 in FIG. 2. The second subordinate data message 610 comprises a message header 210, a message data portion 220 and a message checksum 230. The message data portion 220 comprises a data portion head 221 and a data portion body 222. The data portion body 222 comprises just a datagram 300 with a datagram header 310, a datagram data portion 320 and a datagram counter 330. The datagram data portion 320 of the datagram 300 of the second subordinate data message 610 is extracted by the interface network subscriber 140 as second data 620.

The embodiments of the first subordinate data message 530 and the second subordinate data message 610 that are shown schematically in FIGS. 10 and 11 have the advantage over the embodiments of the first subordinate data message 530 and the second subordinate data message 610 that are shown with reference to FIGS. 6 to 9 that the first data 520 and the second data 620 comprise no header data and therefore have a high useful data proportion.

The interface network subscriber 140 of the network 100 may be designed to support a plurality or all of the embodiments of the first subordinate data message 530 and the second subordinate data message 610 that are explained with reference to FIGS. 6 to 11. To this end, the interface network subscriber 140 can have a plurality of send queues (send FIFOs) and receive queues (receive FIFOs), for example, with each supported variant of the embodiment of the subordinate data messages 530, 610 having an associated send queue and an associated receive queue. In this case, a particular set of send and receive queues may be addressed in the first superordinate data message 510 received by the interface network subscriber 140, this governing which of the described variants of the embodiment of the subordinate data messages 530, 610 is used, that is to say whether the first data 520 that the first superordinate data message 510 contains are interpreted as a complete first subordinate data message 530 (as in FIG. 6), as a message data portion 220 of the first subordinate data message 530 (as in FIG. 8) or as a datagram data portion 320 of the first subordinate data message 530 (as in FIG. 10).

In the case of the first method 400, the first subordinate data message 530 can be transmitted by the interface network subscriber 140, for example with an LRW command (logical memory read write) in the datagram header 310 of a datagram 300 of the first subordinate data message 530. In this case, the first subordinate data message 530 is modified by the second ordinary network subscribers 130 arranged on the subordinate bus 170 and is returned as a second subordinate data message 610 to the interface network subscriber 140. The second data 620 of the second subordinate data message 610 then contain data delivered by the second ordinary network subscribers 130.

However, in the case of the first method 400, a comparatively long time can elapse between the reception of the second subordinate data message 610 in the first method step of the second method portion 600 and the transmission of the second superordinate data message 630 with the second data 620, extracted from the second subordinate data message 610, in the third method step of the second method portion 600. In this case, the second data 620 delivered by the second ordinary network subscribers 130 on the subordinate bus 170 of the network 100 are already a certain age at the time of their forwarding in the second superordinate data message 630 via the superordinate bus 160 of the network 100.

Figure 12:
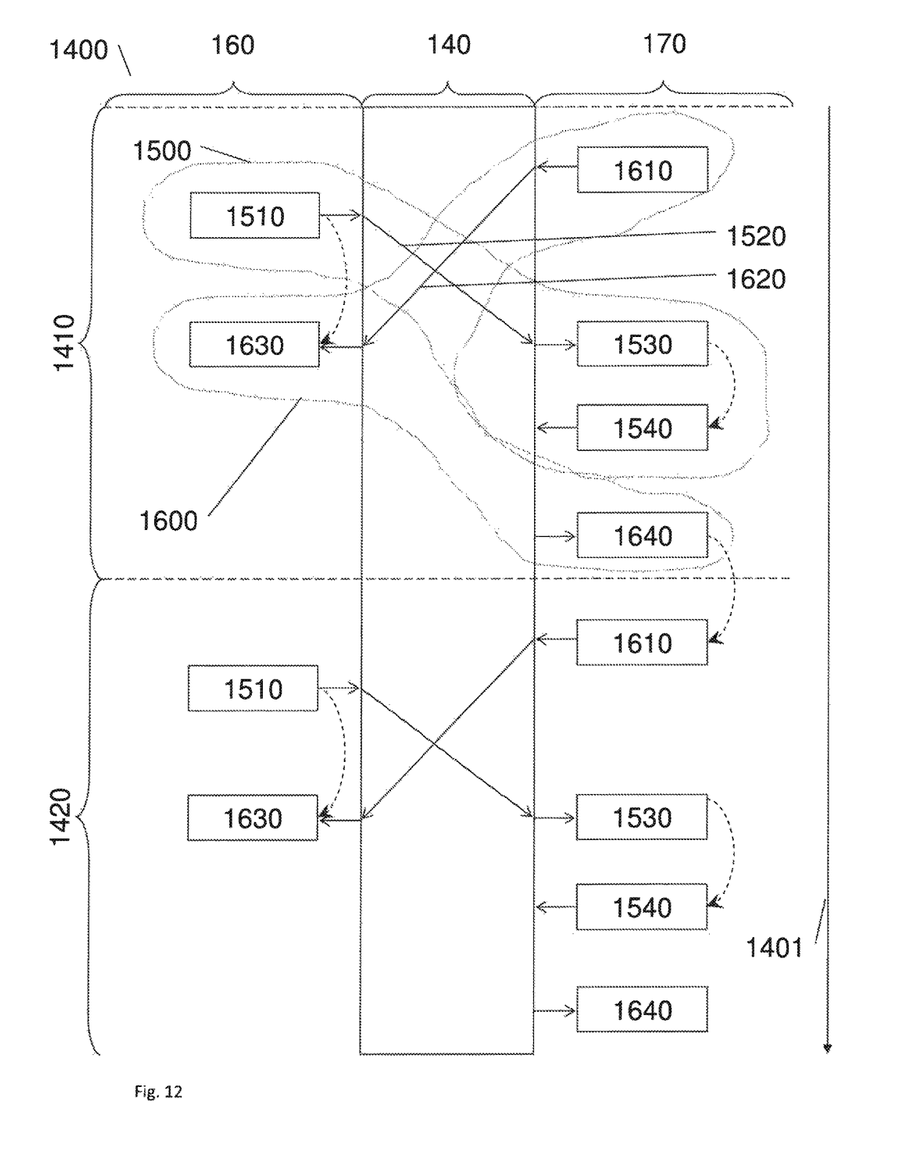
FIG. 12 shows a schematic flowchart for a second method for operating a network.

FIG. 12 shows a schematic flowchart for a second method 1400 for performing the interface tasks of the interface network subscriber 140 in the network 100. A vertical axis of the chart plots a time 1401 progressing from top to bottom. In the center of the chart in FIG. 12, the interface network subscriber 140 in the network 100 is schematically shown. To the left of the interface network subscriber 140, data messages received by the interface network subscriber 140 via the superordinate bus 160 and data messages transmitted by the interface network subscriber 140 via the superordinate bus 160 are shown. To the right of the interface network subscriber 140, data messages received and data messages transmitted by the interface network subscriber 140 via the subordinate bus 170 are shown.

The second method 1400 is preferably performed repeatedly. FIG. 12 shows an example of a first repetition 1410 and a second repetition 1420 of the second method 1400.

The second method 1400 comprises a first method portion 1500 and a second method portion 1600. The first method portion 1500 and the second method portion 1600 each comprise a plurality of method steps and are performed in parallel with one another at least in part.

In a first method step of the first method portion 1500 of the second method 1400, the interface network subscriber 140 receives a first superordinate data message 1510 via the superordinate bus 160. The first superordinate data message 1510 may be designed in the manner of the first superordinate data message 510 of the first method 400.

In a second method step of the first method portion 1500 of the second method 1400, the interface network subscriber 140 extracts first data 1520 from the first superordinate data message 1510. By way of example, the first data 1520 can be written to a send queue of the interface network subscriber 140.

In a third method step of the first method portion 1500 of the second method 1400, the interface network subscriber 140 transmits a first subordinate data message 1530 via the subordinate bus 170. In this case, the first subordinate data message 1530 comprises the first data 1520 previously extracted from the first superordinate data message 1510.

The first subordinate data message 1530 is preferably constructed in the manner of the first subordinate data message 530 of the first method 400 in the variant shown in FIG. 10. In this case, a datagram data portion 320 of a datagram 300 of the first subordinate data message 1530 is thus formed by the first data 1520 extracted from the first superordinate data message 1510. However, the datagram header 310 of this datagram 300 of the first subordinate data message 1530 preferably has an LWR command (logical memory write).

In a fourth method step of the first method portion 1500 of the second method 1400, the interface network subscriber 140 receives a subordinate response data message 1540 via the subordinate bus 170 of the network 100. The subordinate response data message 1540 may have been formed from the first subordinate data message 1530 by virtue of the latter having been returned to the interface network subscriber 140 following circulation via the second ordinary network subscribers 130 on the subordinate bus 170 of the network 100. The subordinate response data message 1540 is not handled further by the interface network subscriber 140.

In a first method step of the second method portion 1600 of the second method 1400, the interface network subscriber 140 receives a second subordinate data message 1610 via the subordinate bus 170 of the network 100. In this case, the second subordinate data message 1610 is preferably designed in the manner of the second subordinate data message 610 of the first method 400 in the variant shown in FIG. 11.

Reception of the second subordinate data message 1610 via the subordinate bus 170 takes place for every repetition 1410, 1420 of the second method 1400 before reception of the first superordinate data message 1510 via the superordinate bus 160 of the network 100 in the first method step of the first method portion 1500 of the second method 1400.

In a second method step of the second method portion 1600 of the second method 1400, the interface network subscriber 140 extracts second data 1620 from the second subordinate data message 1610 received in the preceding method step of the second method portion 1600. In this case, particularly a datagram data portion 320 of a datagram 300 of the second subordinate data message 1610 can be extracted as second data 1620.

In a third method step of the second method portion 1600 of the second method 1400, the interface network subscriber 140 transmits a second superordinate data message 1630 via the superordinate bus 160 of the network 100. In this case, the second superordinate data message 1630 comprises the second data 1620 extracted from the second subordinate data message 1610 in the preceding method step.

The second superordinate data message 1630 of the second method 1400 may be designed in the manner of the second superordinate data message 630 of the first method 400. The interface network subscriber 140 can form the second superordinate data message 1630 from the first superordinate data message 1510, with the interface network subscriber 140 replacing the first data 1520 with the second data 1620.

In a fourth method step of the second method portion 1600 of the second method 1400, the interface network subscriber 140 transmits a request data message 1640 via the subordinate bus 170. The request data message 1640, transmitted in a first repetition 1410 of the second method 1400, in the fourth method step of the second method portion 1600 is used to prompt the transmission of the second subordinate data message 1610 and thereby to allow reception of the second subordinate data message 1610 in the first method step of the second method portion 1600 in a subsequent second repetition 1420 of the second method 1400.

The transmission of the request data message 1640 in the fourth method step of the second method portion 1600 by the interface network subscriber 140 preferably takes place under time control. In this case, the transmission of the request data message 1640 takes place at a time that is in such good time prior to reception of the first superordinate data message 1510 in the first method step of the first method portion 1500 of the subsequent repetition 1420 of the second method 1400 that reception of the second subordinate data message 1610 in the first method step of the second method portion 1600 during the subsequent repetition 1420 of the second method 1400 also takes place before reception of the first superordinate data message 1510 in the first method step of the first method portion 1500 during the subsequent repetition 1420 of the second method 1400. In this case, the transmission of the request data message 1640 preferably takes place so late, however, that the reception of the second subordinate data message 1610 takes place as shortly as possible before reception of the first superordinate data message 1510. In this case, the second data 1620 transmitted in the third method step of the second method portion 1600 with the second superordinate data message 1630 via the superordinate bus 160 have a high level of currentness.

The request data message 1640 may be designed in the manner of the first subordinate data message 1530, but has an LRD command (logical memory read) in the datagram header 310 instead of an LWR command. Furthermore, the request data message 1640 does not have to contain the first data 1520.

The second subordinate data message 1610 received by the interface network subscriber 140 in the first method step of the second method portion 1600 for every repetition 1410, 1420 of the second method 1400 may be formed from the request data message 1640 transmitted by the interface network subscriber 140 during the fourth method step of the second method portion 1600 during a preceding repetition 1410, 1420 of the second method 1400 by virtue of said request data message having the second data 1620 added to it by the second ordinary network subscribers 130 arranged on the subordinate bus 170 of the network 100 and being returned to the interface network subscriber 140.

In an embodiment, a method for operating a network that has a network subscriber that is connected to a superordinate bus and to a subordinate bus comprises steps for the reception of a first superordinate data message by the network subscriber via the superordinate bus, for the extraction of first data from the first superordinate data message by the network subscriber and for the transmission of a first subordinate data message by the network subscriber via the subordinate bus. In this case, the first subordinate data message comprises the first data.

Advantageously, this method allows the network subscriber to act as an interface between the superordinate bus and the subordinate bus of the network. As a result, data traffic on the superordinate bus of the network and data traffic on the subordinate bus of the network can be decoupled from one another. This allows the superordinate bus of the network and the subordinate bus of the network to be operated with different parameters, for example at different transmission rates, without the data traffic on one bus of the network slowing down, blocking or otherwise disturbing the data traffic on the other bus of the network. In particular, the timing of data communication on the superordinate bus of the network is advantageously not influenced by network subscribers arranged on the subordinate bus of the network. Furthermore, the method advantageously allows all network subscribers in the network to be reached with just one data message. Advantageously, no routing tables are needed in this context. There is also no need for complex network planning for the network.

In one embodiment of the method, first data extracted from the first superordinate data message form the first subordinate data message. The first superordinate data message contains the first subordinate data message completely, therefore, in this case.

Advantageously, this makes the production of the first subordinate data message by the network subscriber a particularly simple matter. A further advantage is that the structure and content of the first subordinate data message can be chosen particularly flexibly in this case.

In one embodiment of the method, the first data extracted from the first superordinate data message form a first subordinate datagram. In this case, the first subordinate data message comprises a stipulated message header and the first subordinate datagram. As a result, the first superordinate data message does not need to contain the message header of the first subordinate data message in this case. This means that the first superordinate data message can advantageously have a higher proportion of useful data in this case. The stipulated message header may be preconfigured in the network subscriber, for example.

In one embodiment of the method, the first subordinate data message comprises a stipulated message header and a first subordinate datagram. In this case, the first subordinate datagram comprises a stipulated datagram header and the first data extracted from the first superordinate data message. In this case, the first superordinate data message thus needs to contain neither the message header nor the datagram header of the first subordinate data message. As a result, the first superordinate data message can advantageously have an even higher proportion of useful data. The message header of the first subordinate data message and the datagram header of the first subordinate datagram of the first subordinate data message can be preconfigured in the network subscriber, for example.

In one embodiment of the method, said method comprises further steps for the reception of a second subordinate data message by the network subscriber via the subordinate bus, for the extraction of second data from the second subordinate data message by the network subscriber and for the transmission of a second superordinate data message by the network subscriber via the superordinate bus. The second superordinate data message comprises the second data. Advantageously, this method allows the network subscriber to act as an interface between the subordinate bus and the superordinate bus of the network for a communication direction from the subordinate bus to the superordinate bus of the network. As a result, the method advantageously allows bidirectional data interchange between the superordinate bus and the subordinate bus of the network. In so doing, the method ensures that data communication from the superordinate bus and data communication from the subordinate bus of the network do not hamper one another.

In one embodiment of the method, the second superordinate data message comprises the entire second subordinate data message as second data. In this case, the extraction of the second data from the second subordinate data message is thus limited to complete transfer of the second subordinate data message as second data. The second subordinate data message is embedded completely into the second superordinate data message. Advantageously, the method can be performed particularly easily as a result.

In one embodiment of the method, the second subordinate data message comprises a message header and a second subordinate datagram. In this case, the second subordinate datagram forms the second data. The second subordinate datagram is therefore extracted from the second subordinate data message and embedded into the second superordinate data message. Advantageously, the message header of the second subordinate data message is not transferred to the second superordinate data message in this case, which increases a proportion of useful data in the second superordinate data message.

In one embodiment of the method, the second subordinate data message comprises a message header and a second subordinate datagram. In this case, the second subordinate datagram comprises a datagram header and the second data. Advantageously, neither the message header of the second subordinate data message nor the datagram header of the second subordinate datagram of the second subordinate data message are transferred to the second superordinate data message in this case. This increases a proportion of useful data in the second superordinate data message advantageously further still.

In one embodiment of the method, the second superordinate data message is formed from the first superordinate data message. This is achieved by replacing the first data by the second data. The first superordinate data message may be an ordinary data message that is used for data communication on the superordinate bus of the network in this case. The first superordinate data message can comprise not only the first data but also further data that are addressed to other network subscribers on the superordinate bus of the network. In this method, these further data are advantageously forwarded by the network subscriber with the second superordinate data message on the superordinate bus.

In one embodiment of the method, the reception of the second subordinate data message takes place before the transmission of the first subordinate data message. Advantageously, this allows essentially delay-free transmission of the second superordinate data message via the superordinate bus after reception of the first superordinate data message. As a result, data communication on the superordinate bus is advantageously not hampered by the presence of the subordinate bus and by the activity of the network subscriber as an interface between the superordinate bus and the subordinate bus.

In one embodiment of the method, said method is performed repeatedly. In this case, the transmission of the first subordinate data message by the network subscriber during a first repetition of the method prompts transmission of the second subordinate data message during a second repetition of the method. As a result, the second subordinate data message can be understood as a response to the first subordinate data message. Advantageously, the method can be performed particularly simply as a result.

In one embodiment of the method, the second subordinate data message transmitted during the second repetition of the method is formed from the first subordinate data message transmitted during the first repetition of the method. In this case, data messages can circulate on the subordinate bus of the network. The first subordinate data message then circulates via all network subscribers on the subordinate bus of the network and returns as a second subordinate data message to the network subscriber forming the interface to the superordinate bus of the network.

In one embodiment of the method, the network subscriber transmits a request data message via the subordinate bus under time control in order to prompt transmission of the second subordinate data message. In this case, the transmission of the request data message can take place at a time that is chosen such that there is the assurance that the second subordinate data message arrives at the network subscriber shortly before the arrival of the first superordinate data message. As a result, the second data that are then forwarded with the second superordinate data message advantageously have a high level of currentness.

In one embodiment of the method, the first superordinate data message and the first subordinate data message are Ethernet messages. Advantageously, this allows the method to be used in an Ethernet network. This opens up a large possible scope of application for the method.

In one embodiment of the method, the first superordinate data message and the first subordinate data message are EtherCAT messages. This advantageously allows the method to be used in networks in industrial manufacture and/or automation engineering.

In one embodiment of the method, the first superordinate data message comprises a message header and a superordinate datagram. The superordinate datagram comprises a datagram header and the first data. In this case, the first superordinate data message can advantageously comprise not only the superordinate datagram but also further datagrams that are addressed to the network subscriber serving as an interface between the superordinate bus and the subordinate bus of the network or to other network subscribers on the superordinate bus of the network. This advantageously allows the first superordinate data message to be used to address a plurality of or all network subscribers on the superordinate bus of the network.

In one embodiment of the method, the datagram header has an LRW command (logical memory read write). This advantageously allows data to be simultaneously transmitted from the superordinate bus of the network to network subscribers on the subordinate bus of the network, and also data from network subscribers on the subordinate bus of the network to the superordinate bus of the network.

In one embodiment of the method, the first superordinate data message is an Ethernet jumbo frame, that is to say a data message that has a greater length than an Ethernet standard length, for example a length of more than 1518 bytes. This allows a large volume of first data to be embedded into the first superordinate data message. By way of example, it allows the first data embedded in the first superordinate data message to comprise a complete first subordinate data message.

In one embodiment of the method, the superordinate bus is operated at a transmission rate of 1 Gbit/s. In this case, the subordinate bus is operated at a transmission rate of 100 Mbit/s. Advantageously, the data communication on the superordinate bus is not forced to slow down in this case by the slower data communication on the subordinate bus.

The invention claimed is:

1. A method for operating a network,
   wherein the network has a network subscriber that is connected to a superordinate bus and to a subordinate bus,
   wherein the method comprises the following steps:
   reception of a first superordinate data message by the network subscriber via the superordinate bus;
   extraction of first data from the first superordinate data message by the network subscriber;
   transmission of a first subordinate data message by the network subscriber via the subordinate bus, wherein the first subordinate data message comprises the first data;
   reception of a second subordinate data message by the network subscriber via the subordinate bus;
   extraction of second data from the second subordinate data message by the network subscriber; and
   transmission of a second superordinate data message by the network subscriber via the superordinate bus, wherein the second superordinate data message comprises the second data;
   wherein the second superordinate data message is formed from the first superordinate data message by replacing the first data by the second data; and
   wherein the reception of the second subordinate data message takes place before the transmission of the first subordinate data message.

2. The method as claimed in claim 1, wherein the first data extracted from the first superordinate data message form the first subordinate data message.

3. The method as claimed in claim 1,
   wherein the first data extracted from the first superordinate data message form a first subordinate datagram, and
   wherein the first subordinate data message comprises a stipulated message header and the first subordinate datagram.

4. The method as claimed in claim 1,
   wherein the first subordinate data message comprises a stipulated message header and a first subordinate datagram, and
   wherein the first subordinate datagram comprises a stipulated datagram header and the first data extracted from the first superordinate data message.

5. The method as claimed in claim 1, wherein the second superordinate data message comprises the entire second subordinate data message as second data.

6. The method as claimed in claim 1,
   wherein the second subordinate data message comprises a message header and a second subordinate datagram, and
   wherein the second subordinate datagram forms the second data.

7. The method as claimed in claim 1,
   wherein the second subordinate data message comprises a message header and a second subordinate datagram, and
   wherein the second subordinate datagram comprises a datagram header and the second data.

8. The method as claimed in claim 1,
   wherein the method is performed repeatedly, and wherein the transmission of the first subordinate data message by the network subscriber during a first repetition of the method prompts transmission of the second subordinate data message during a second repetition of the method.

9. The method as claimed in claim 8, wherein the second subordinate data message transmitted during the second repetition of the method is formed from the first subordinate data message transmitted during the first repetition of the method.

10. The method as claimed in claim 1, wherein the network subscriber transmits a request data message via the subordinate bus under time control in order to prompt transmission of the second subordinate data message.

11. The method as claimed in claim 1, wherein the first superordinate data message and the first subordinate data message are Ethernet messages.

12. The method as claimed in claim 11, wherein the first superordinate data message and the first subordinate data message are EtherCAT messages.

13. The method as claimed in claim 12,
wherein the first superordinate data message comprises a message header and a superordinate datagram, and
wherein the superordinate datagram comprises a datagram header and the first data.

14. The method as claimed in claim 13, wherein the datagram header has an LRW command.

15. The method as claimed in claim 11, wherein the first superordinate data message is an Ethernet jumbo frame.

16. The method as claimed in claim 1,
wherein the superordinate bus is operated at a transmission rate of 1 Gbit/s, and
wherein the subordinate bus is operated at a transmission rate of 100 Mbit/s.

* * * * *